US010907075B2

(12) United States Patent
Yang

(10) Patent No.: US 10,907,075 B2
(45) Date of Patent: Feb. 2, 2021

(54) CHEMICALLY MINIMIZED SYSTEM FOR TIME REDUCED APPLICATION OF EYELASH EXTENSIONS

(71) Applicant: Soo-Jin Yang, El Cerrito, CA (US)

(72) Inventor: Soo-Jin Yang, El Cerrito, CA (US)

(73) Assignee: COSMO SPA LOUNGE & SUPPLY, INC., Oakland, CA (US)

(*) Notice: Subject to any disclaimer, the term of this patent is extended or adjusted under 35 U.S.C. 154(b) by 256 days.

(21) Appl. No.: 15/143,118

(22) Filed: Apr. 29, 2016

(65) Prior Publication Data

US 2016/0316840 A1 Nov. 3, 2016

Related U.S. Application Data

(60) Provisional application No. 62/155,902, filed on May 1, 2015.

(51) Int. Cl.
*A41G 5/00* (2006.01)
*C09J 5/00* (2006.01)
*A41G 5/02* (2006.01)

(52) U.S. Cl.
CPC ...... *C09J 5/00* (2013.01); *A41G 5/02* (2013.01); *A41G 5/0086* (2013.01); *C09J 2301/416* (2020.08); *C09J 2433/00* (2013.01)

(58) Field of Classification Search
CPC . A41G 5/02; A41G 5/04; A41G 5/004; A41G 5/06; A41G 2040/0012; A45D 40/205; A45D 40/20; A45D 40/28; A45D 2200/1072; A45D 2200/25; A61B 90/30; A61B 90/308; A61B 90/35; A61B 2090/309

USPC .............. 606/210–211; 132/201, 53
See application file for complete search history.

(56) References Cited

U.S. PATENT DOCUMENTS

| 3,287,547 | A | * | 11/1966 | Spedding | F21V 33/00 |
| | | | | | 294/99.2 |
| D506,574 | S | * | 6/2005 | Yip | D26/51 |
| 7,108,395 | B2 | * | 9/2006 | Correa | A61B 17/30 |
| | | | | | 362/119 |
| 7,339,754 | B2 | * | 3/2008 | Neal | A45D 26/0066 |
| | | | | | 294/99.2 |

(Continued)

FOREIGN PATENT DOCUMENTS

| CN | 201559137 U | 8/2010 |
| CN | 202288607 U | 7/2012 |

(Continued)

OTHER PUBLICATIONS

International Search Report and Written Opinion for PCT Application No. PCT/US16/30216; dated Aug. 12, 2016.

(Continued)

*Primary Examiner* — Rachel R Steitz
*Assistant Examiner* — Brianne E Kalach
(74) *Attorney, Agent, or Firm* — Dergosits & Noah LLP

(57) ABSTRACT

A system for the professional preparation and implementation of eyelash and hair extension application which may include the use of chemically reduced bonding agents such as cyanoacrylate based adhesive, non-adhesive bonding gel, micro-fiber skin protection strips and staging pallets, brushless micro-applicators and tweezers including an affixed UV light source.

18 Claims, 16 Drawing Sheets

(56) References Cited

U.S. PATENT DOCUMENTS

| | | | |
|---|---|---|---|
| 2006/0119840 A1* | 6/2006 | Garcia | G01J 1/32 356/213 |
| 2008/0223390 A1 | 9/2008 | Brown | |
| 2008/0287564 A1* | 11/2008 | Klare | C08G 18/672 522/96 |
| 2009/0266376 A1* | 10/2009 | Beschta | A41G 5/02 132/201 |
| 2010/0170526 A1 | 7/2010 | Nguyen | |
| 2013/0213427 A1 | 8/2013 | Dinh | |
| 2014/0026913 A1* | 1/2014 | Dinh | A41G 5/02 132/53 |

FOREIGN PATENT DOCUMENTS

| | | |
|---|---|---|
| CN | 204293228 U | 4/2015 |
| EP | 0990432 A1 | 4/2000 |
| JP | 2015059280 A | 3/2015 |
| WO | 2013/192515 A1 | 12/2013 |

OTHER PUBLICATIONS

International Preliminary Report on Patentability and Written Opinion dated Nov. 7, 2017 related to PCT Application No. PCT/US2016/030216 filed Apr. 29, 2016.

* cited by examiner

CHEMICALLY MINIMIZED SYSTEM FOR TIME REDUCED APPLICATION OF EYELASH EXTENSIONS

CROSS-REFERENCE TO RELATED APPLICATIONS

This nonprovisional patent application claims benefit and priority of U.S. Provisional Patent Application No. 62/155,902, filed on May 1, 2015, titled "A CHEMICALLY MINIMIZED SYSTEM FOR TIME REDUCED APPLICATION OF EYELASH EXTENSIONS", the contents of which are incorporated by reference as if fully set forth herein.

FIELD OF INVENTION

The application relates generally to the staging and attachment of eyelash extensions and more particularly to a novel system of attaching eyelash and hair extensions in a plurality of positions by employing a combination of adhesive or curable gel and tools including tweezers with a built in UV light source intended to improve the application of extensions by reducing application time and the use of chemically reactive materials.

BACKGROUND

The successful operation of a system of applying eyelash and hair extensions in a time efficient fashion without compromising the accurate and safe application or the ability of the application subject to freely engage in normal activities following such application has been met with various problems since eyelash extensions became commercially available. These problems include adhesive compounds which either do not dry fast enough to allow for an efficient application system or which cannot dry efficiently without resulting in unsightly clumping, as well as exposure of application subjects to potentially noxious off-gassing. These problems also include the inability of application subjects to make use of makeup remover while extensions remain attached or to use the shower or go swimming within 24 hours of application. Further, prolonged application process times can result in the development of various chronic and degenerative conditions by the application professional.

The system described in this application solves those problems in a novel fashion by employing a combination of elements including low viscosity adhesive or sealable bonding agents and tools which may include a micro-applicator, a protective strip, a plastic adhesive dish (P.A.D.), a sponge tip accessory, and tweezers affixed with a UV light source capable of curing a bonding agent via photoinitiation. Low viscosity adhesive or sealable bonding agents may dry within as little as 2 to 3 seconds of application thus enabling a total application period which is shorter than any other application system presently operated while not compromising the accurate or safe placement of attached extensions. Accurate placement of extensions may be facilitated by the use of a micro-applicator which may not only be used as a tool for applying a minimal amount of adhesive or bonding agent at each application point, but may also be used as a tool of measurement and as a means for smoothing out adhesive or bonding agent upon application. Tweezers may be utilized for placing individual or groupings of extensions and through the affixing of a UV light source to the tweezers to form a novel apparatus which may be utilized to simultaneously cure the preferred bonding agent and focus illumination on the attachment area without pausing between extension applications.

SUMMARY OF THE INVENTION

The invention may be characterized as a novel method and apparatus which improves upon current systems of applying and attaching eyelash and hair extensions by reducing the amount of time required throughout the attachment procedure without compromising the accuracy or safety of the procedure and minimizing the exposure of the attachment subject to noxious chemicals while enabling the application subject to participate in everyday activities without impediment immediately after extensions are attached.

The invention may be further characterized as a system for the professional preparation and implementation of eyelash and hair extension application which may include the use of chemically reduced bonding agents such as Cyanoacrylate based adhesive, non-adhesive bonding gel, microfiber skin protection strips and staging pallets, brushless micro-applicators and tweezers including an affixed light source. An adhesive agent may be pigmented as desired or may be clear and is capable of drying within as little as 2 to 3 seconds upon application. Non-adhesive bonding gel may be pigmented as desired or may be clear and is capable of curing simultaneously through exposure to a source of UV emission such as, for example, a light emitting diode ("LED") or a UV laser while application is occurring. Micro-fiber skin protection strips may be cut to fit the shape and contour of the area surrounding the application zone and may be utilized as pallets for staging the adhesive or bonding agent, allowing for greater reduction in application time and potential skin exposure. Brushless micro applicators similar to micro-dental brushes may be used to apply adhesive or bonding agent at the point of extension attachment and may be simultaneously be utilized as a tool of measurement to achieve extension attachment point that can be within one millimeter of each other and within one millimeter of the skin surface if desired. Tweezers are typically used to separate lashes around each application point and hold an eyelash extension when attaching it. Tweezers may be affixed with an UV light source capable of casting a directed source of light onto the area of attachment and allowing for both greater precision of attachment as well as for a curing process when non-adhesive bonding gel is used for affixing an extension

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION OF THE INVENTION

Figure 1:
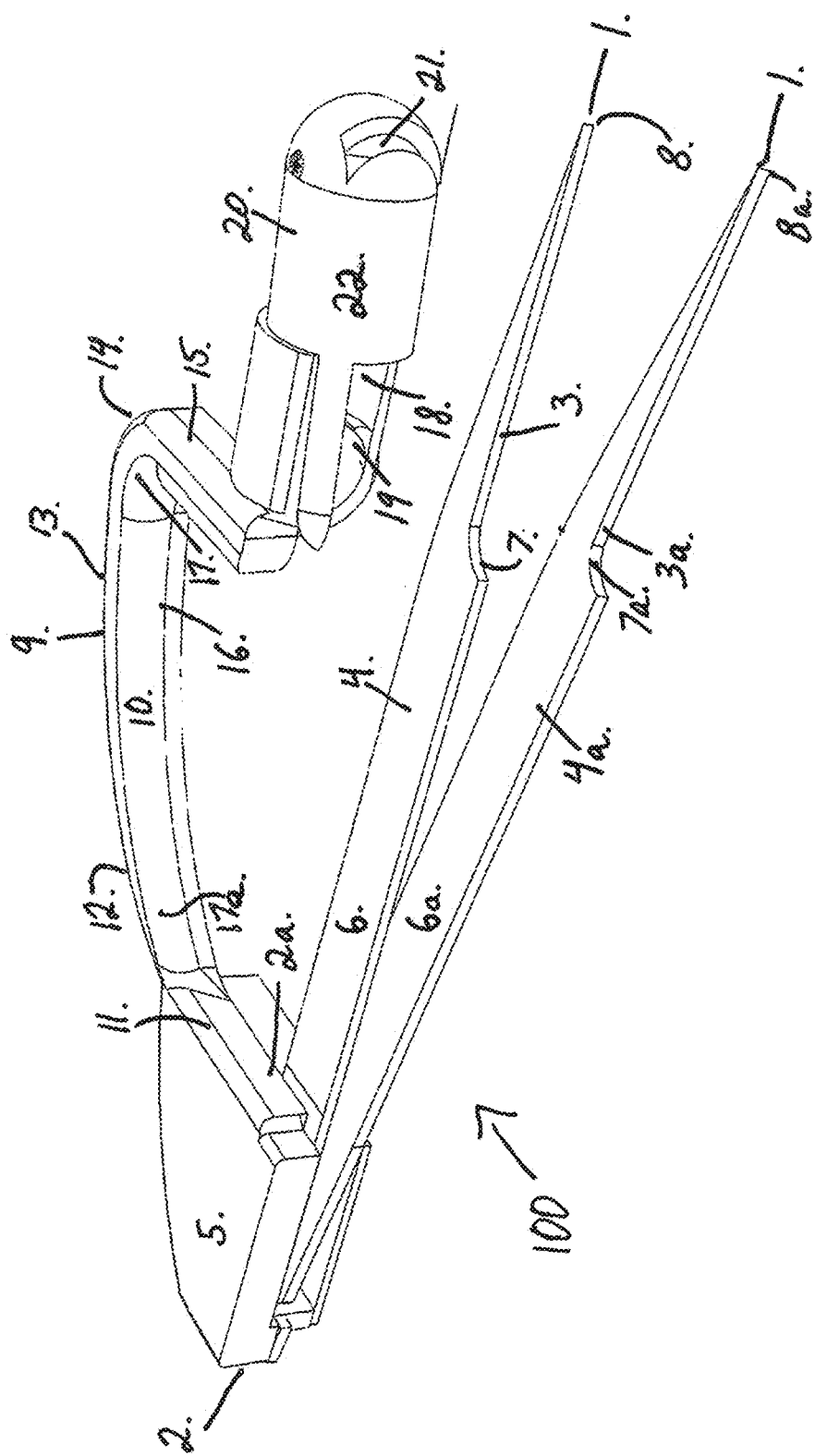
FIG. 1 is a contour-line perspective view of an apparatus for applying eyelash extensions to a subject's eyelashes. One of two substantially similar LED arms of the apparatus is shown.

The present invention relates to a system and novel form of an apparatus for applying eyelash extensions to a user's eyelashes as well as for application of hair extensions. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

First Preferred Embodiment

Referring now to the drawings, a first embodiment of the system is illustrated FIGS. 1-8 and may include a plurality of elements and stages to realize its operation.

Figure 2:
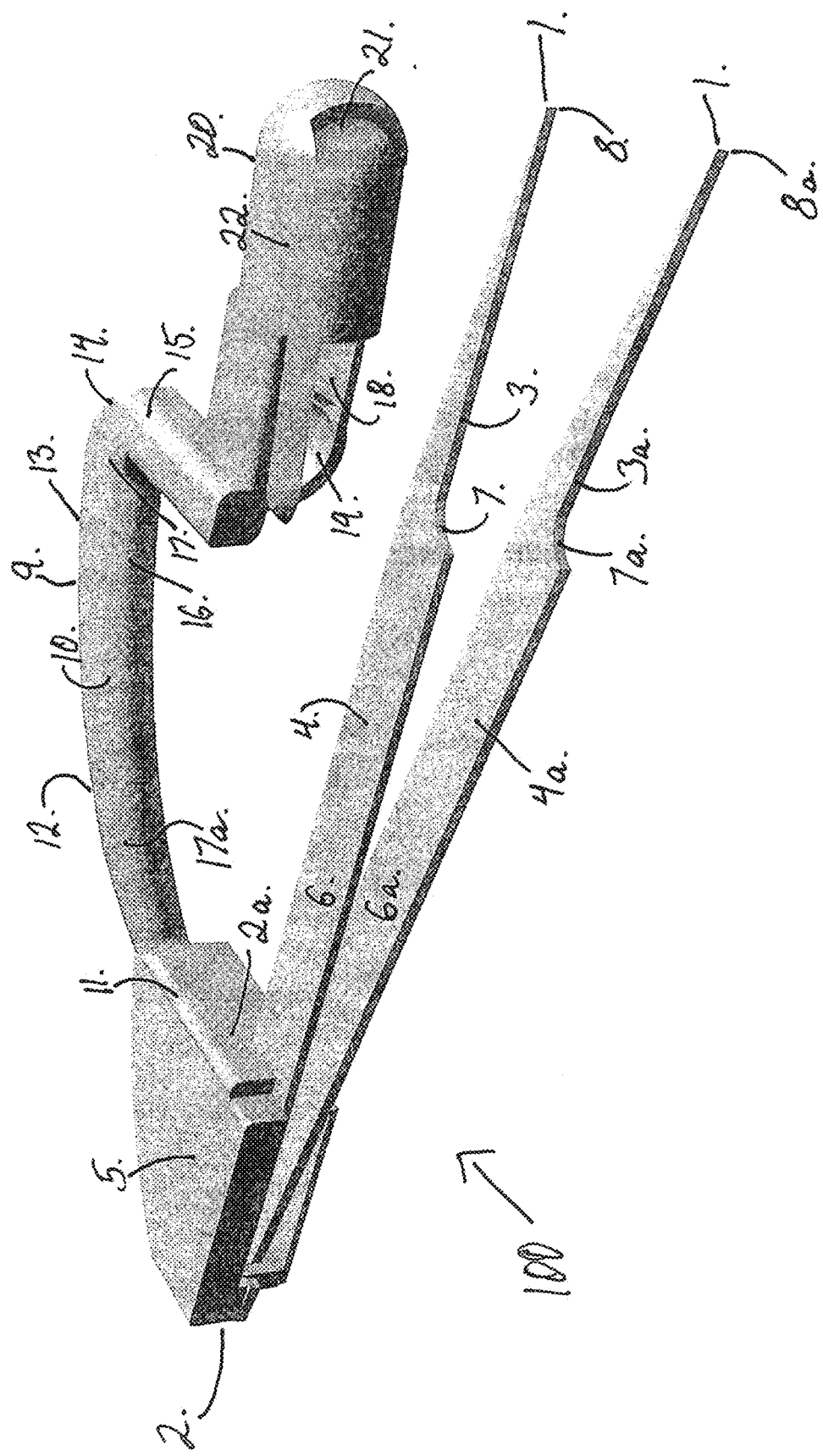
FIG. 2 is a solid-form perspective view of an apparatus for applying eyelash extensions to a subject's eyelashes. One of two substantially similar LED arms of the apparatus is shown.

A first embodiment of the system may employ an apparatus 100 comprised of tweezers affixed with dual LED elements in its expression, as depicted in FIGS. 1-8. As depicted in FIGS. 1 and 2, the dimensions of this apparatus viewed from an elevated angle lying along a horizontal plane, may exist within a range. A first embodiment of the apparatus may be viewed in this fashion as a perspective view depicting the apparatus with both tweezers and one of two substantially similar arms capable of being affixed with an LED.

As depicted in FIGS. 1 and 2, apparatus 100 comprises a base area 5 and two tweezer portions 6 and 6a connected to base area 5. In a preferred embodiment, the length of each of two tweezer portions 6 and 6a of the apparatus 100 may be approximately one hundred and thirty one millimeters as measured from a terminating point 1 and 1a of tweezer portions 6 and 6a, respectively, to the inside edge 2a of base area 5. In a preferred embodiment, the length of the body portion 5 of the apparatus 100 may be approximately thirty millimeters between the inside edge 2a of base area 5 and the outside edge 2 of base area 5.

Tweezer portions 6 and 6a comprise a generally rectangular body portions 4 and 4a and a generally triangular tapering portions 3 and 3a. In a preferred embodiment, body portions 4 and 4a have a length of approximately ninety one millimeters as measured from the inside edge 2a of base 5 to curved portions 7 and 7a of tweezer portions 6 and 6a and may generally be consistent in width. In a preferred embodiment, tapering portions 3 and 3a of tweezer portions 6 and 6a may extend approximately forty millimeters from curved portions 7 and 7a to terminating points 1 and 1a.

In a preferred embodiment, the width of body portions 4 and 4a between inside edge 2a of base 5 and curved portions 7 and 7a may be approximately ten millimeters. Tapering portions 3 and 3a of tweezer portions 6 and 6a may have a width that is steadily reduced along both sides of tapering portions 3 and 3a between curved portions 7 and 7a and terminating points 1 and 1a. In a preferred embodiment, terminating points 1 and 1a of tapering portions 3 and 3a comprise flattened points 8 and 8a having a surface area of approximately one square millimeter. In a preferred embodiment, body portions 4 and 4a and tapering portions 3 and 3a of each of tweezer portions 6 and 6a may each be approximately nine millimeters thick.

In an embodiment, arm 10 supporting an LED housing unit 22 extends over and above the outward facing surface 4 of tweezer portion 6. As more specifically depicted in FIG. 9 referencing an additional embodiment, tweezer portions 29 and 29a may be bracketed by two arms 30 and 30a providing controllable and adjustable light sources for tweezer portions 29 and 29a.

As shown in FIGS. 1 and 2, arm 10 connects to and extends outwards from portion 11 of inside edge 2a of base area 5. Viewed from the present angle depicted in FIGS. 1 and 2, arm 10 comprises an outer side surface 9 and an inner side surface 16. Outer surface 9 comprises a first curved portion 12, a generally straight portion 13, and a second curved portion 14. In a preferred embodiment, the length of outer surface 9 of arm 10 is approximately seventy four millimeters. In a preferred embodiment, the length of inner surface 16 of arm 10, located between curved surfaces 17 and 17a, is approximately sixty seven millimeters.

In a preferred embodiment, second curved portion 14 of arm 10 has more curvature than the first curved portion 12 of arm 10. In a preferred embodiment, curved portions 12 and 14 of outer side surface 9 of arm 10 may be convex while curved portions 17 and 17a of inner side surface 9 of arm 10 may be concave. Curved portion 14 may continue to curve over an arc of approximately ninety degrees and arm 10 may then extend in a generally straight fashion 15 until connecting to LED housing unit 22.

A straight portion 15 connects arm 10 and LED housing unit 22. In a preferred embodiment, straight portion 15 has a length of approximately twenty two millimeters and a width of approximately seven millimeters.

In a preferred embodiment, LED housing unit 22 comprises a half of a hollowed out pill-shaped shell 18. LED housing unit 22 may be connected to vertical portion 15 with the hollowed out portion of shell 18 positioned with an open side 19 facing towards tapering portion 3 of tweezer portions 6. In a preferred embodiment, shell 18 may have a length of approximately thirty millimeters and an interior width of approximately seven millimeters.

In a preferred embodiment, LED housing unit 22 may comprise a portion of shell 19 which is closed 20 except for curved opening at one end 21 allowing for the focused emission of light and heat.

Figure 3:
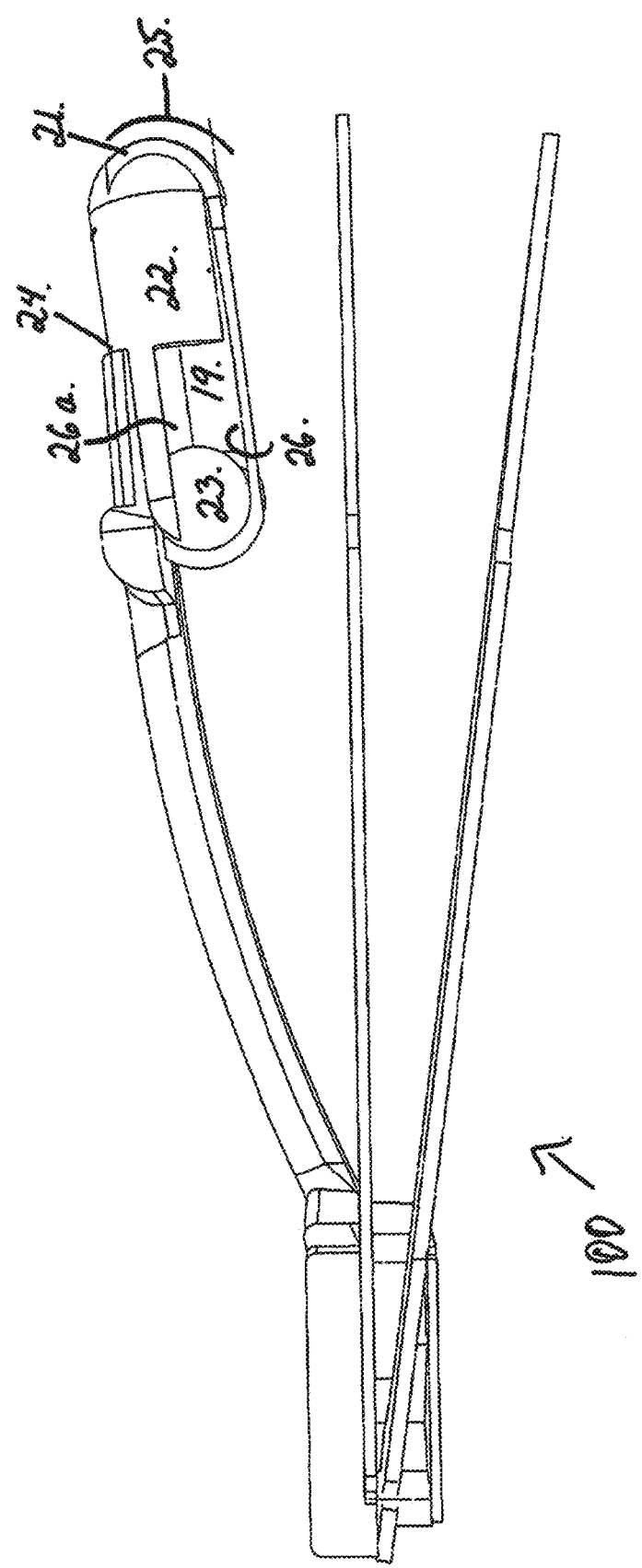
FIG. 3 is a contour-line side view of an apparatus for applying eyelash extensions to a subject's eyelashes. Detail of the open underside of an LED housing unit of an arm of the apparatus is shown.
Figure 4:
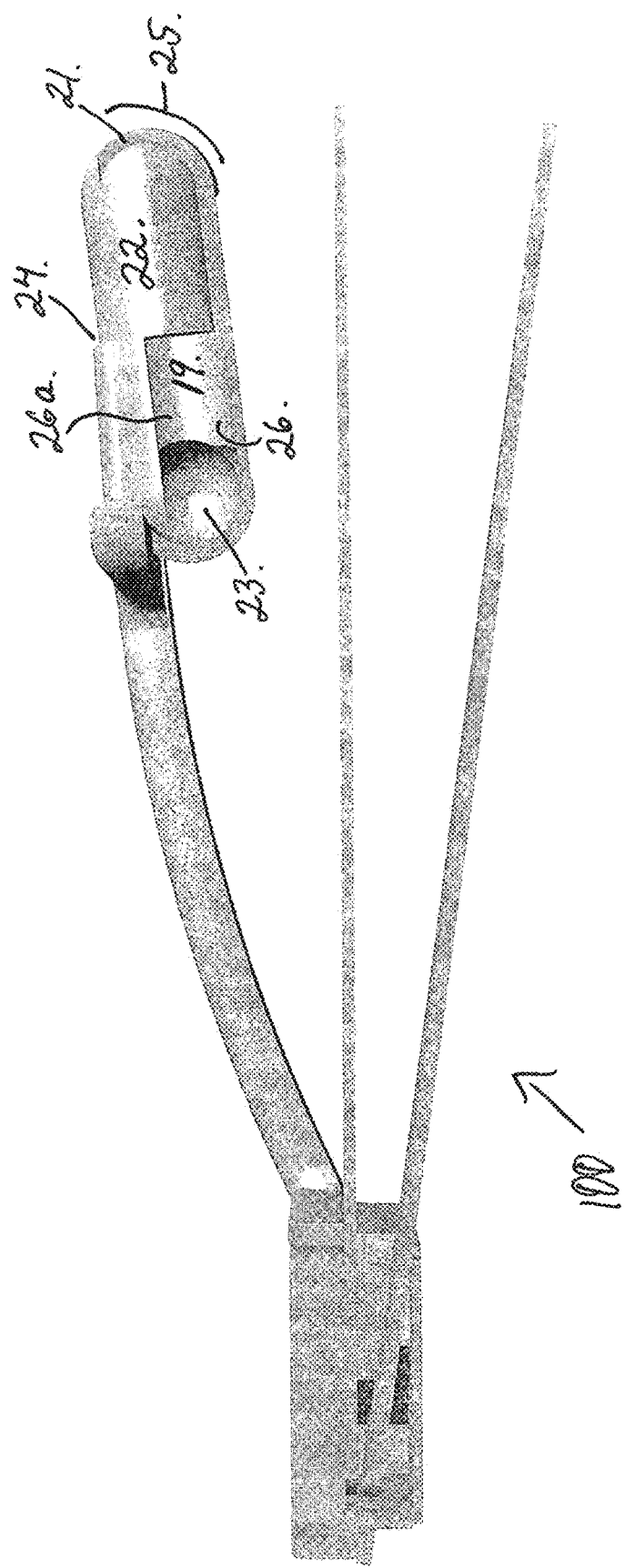
FIG. 4 is a solid-form side view of an apparatus or applying eyelash extensions to a subject's eyelashes. Detail of the open underside of an LED housing unit of an arm of the apparatus is shown.

As depicted in FIG. 3, LED housing unit 22 may comprise an interior bowl 23 capable of accommodating a lamp encasing an LED. Open portion 19 of LED housing unit 22 allows for a lamp to be slightly oversized as compared to the interior dimensions of its housing area so that it may protrude outwards from interior bowl 23. An oversized lamp encasing an LED housed in this fashion is intended to reduce the overall amount of heat emitted in the area while the system is operating. A reduction in heat emission can increase the lifetime of an LED employed within the system and eliminate a need for the apparatus to incorporate a heatsink, while not compromising the effectiveness with which an LED can function to cause curing of application gel utilized in the system.

A portion of LED housing unit 22 may comprise a cover 24 that can swing open to allow for the removal or insertion of an LED encasing lamp.

An LED is considered the preferred means for curing application gel via photoinitiation as an LED can operate within the system at a high rate of efficiency when compared to alternative light sources such as mercury-vapor lamps. A lamp encasement and LED housing unit 22 may also be expressed in considerably smaller dimensions than would be required for alternative light sources. A lamp encasement and LED housing unit 22 expressed in relatively smaller dimensions as depicted in the foregoing may still facilitate acceptable levels of energy consumption and dissipation while meeting target application times within the System.

In a preferred embodiment, an LED in LED housing unit 22 may operate with a power input causing light emission at UV-A wavelengths within an approximate range of three hundred and fifteen to four hundred nanometers. A peak wavelength range may occur between approximately three hundred and ninety five and four hundred and five nanometers at an approximate average of four hundred nanometers.

As depicted in FIG. 3, an LED in LED housing unit 22 operating within the range of target wavelengths intended for employment by the system may have a light emission range of approximately sixty to one hundred and twenty degrees 25. Light emitted from an LED may be focused upon an intended target area by LED housing unit 22 having curved opening 21. A majority of light emitted by an LED may be further focused by interior walls 26 of LED housing unit 22 causing light emission outside this range to be reflected back towards the interior portion of LED housing unit 22.

Employment of dual LED lighting sources affixed to arms bracketing tweezers in the apparatus is intended to allow for the operation of the System at longer wavelengths and closer proximity to the target area without resulting in unsafe or uneven exposure at application targets. Employment of dual bracketing LED lighting sources is further intended to minimize the exposure time required to cure the application gel during each application instance.

Figure 5:
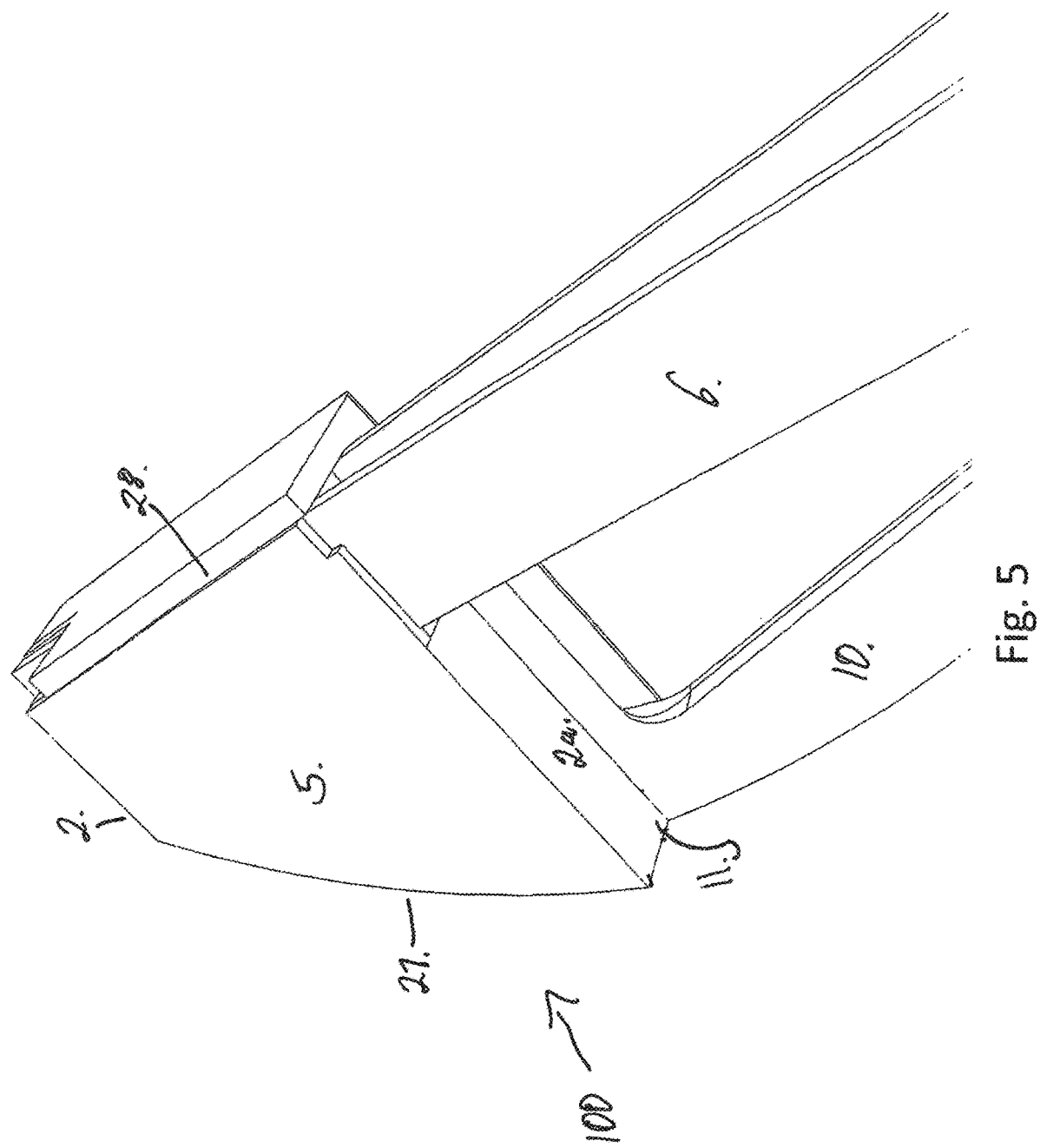
FIG. 5 depicts a magnified contour-line perspective view of the base area of an apparatus for applying eyelash extensions to a subject's eyelashes.
Figure 6:
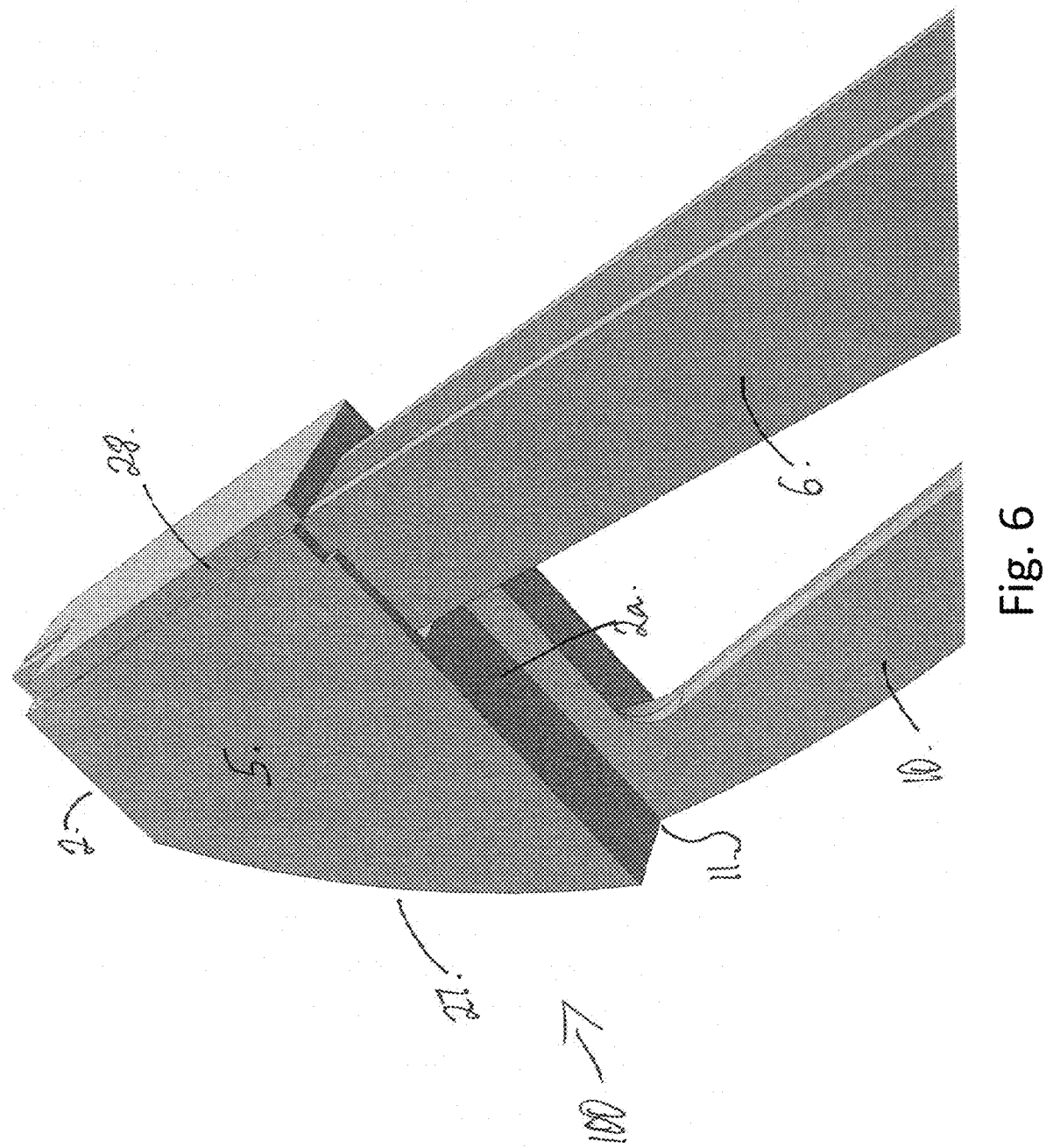
FIG. 6 depicts a magnified solid-form perspective view of the base area of an apparatus for applying eyelash extensions to a subject's eyelashes.
Figure 7:
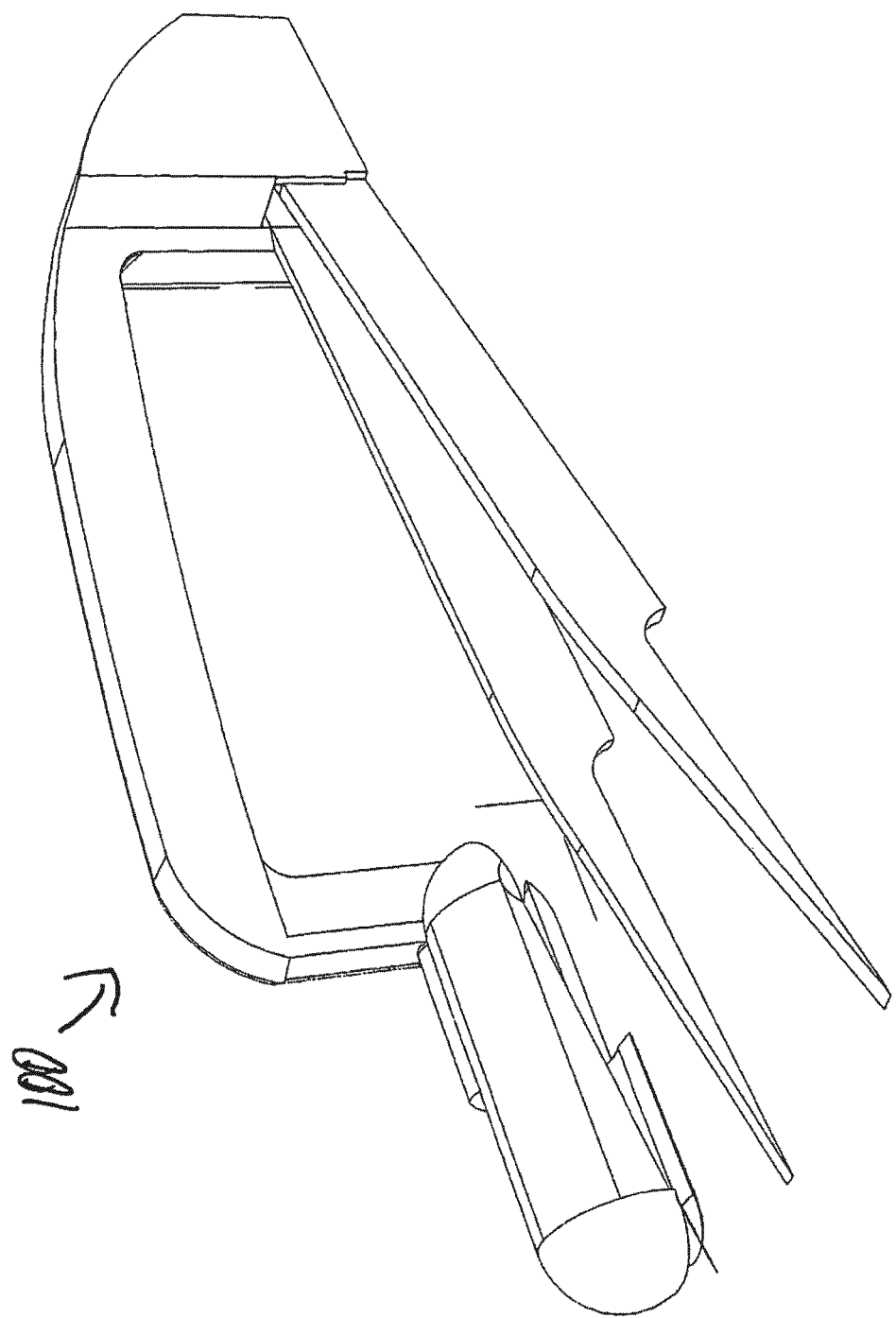
FIG. 7 depicts an additional contour-line perspective view of an apparatus for applying eyelash extensions to a subject's eyelashes.
Figure 8:
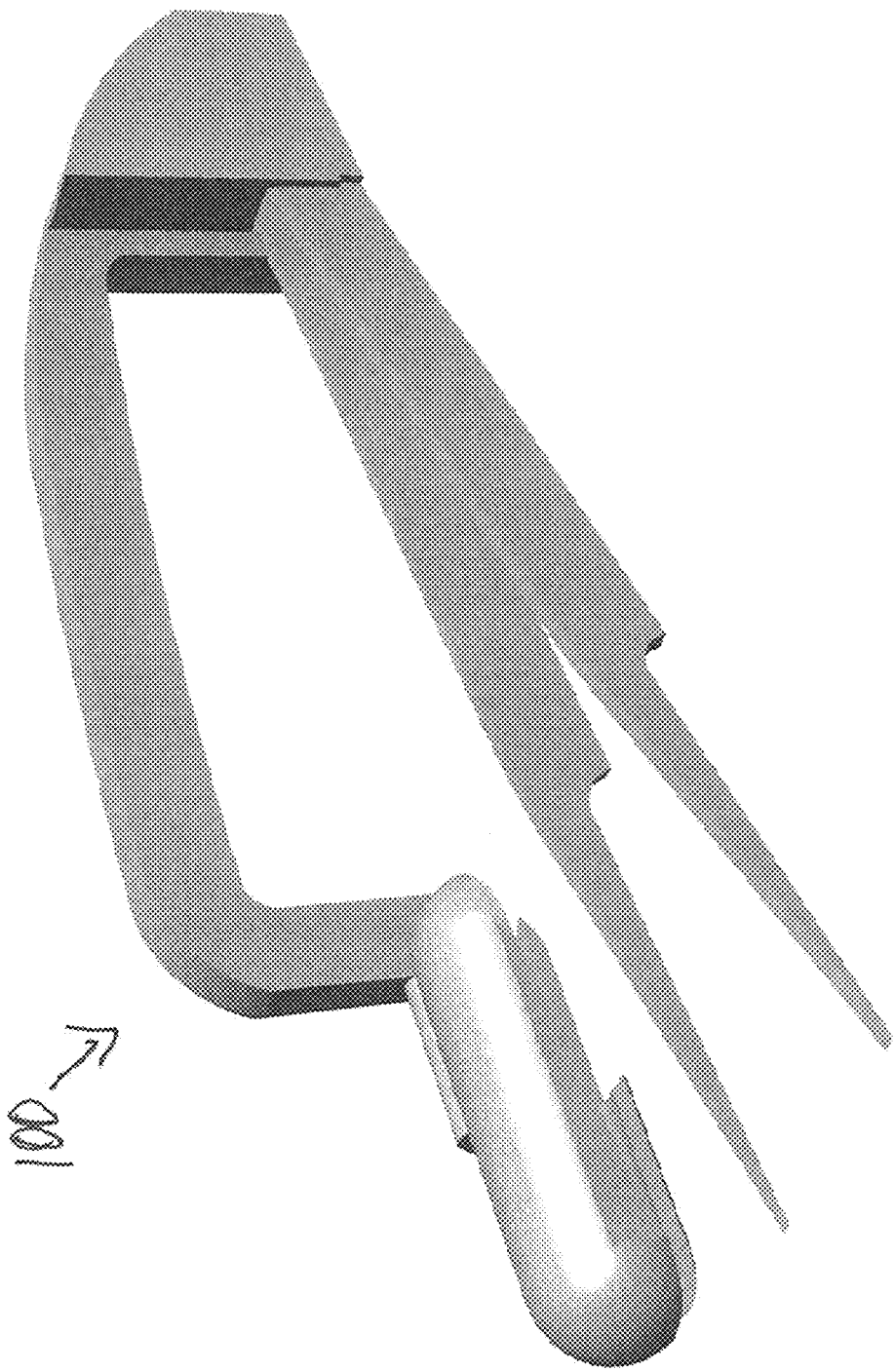
FIG. 8 depicts an additional solid-form perspective view of an apparatus for applying eyelash extensions to a subject's eyelashes.

As depicted in FIGS. 5 and 6, base area 5 of the apparatus 100 may serve as an area of connection between tweezer portions 6 and 6a at a lower portion of inside edge 2a and may serve as an area of connection between the bracketing arms 10 at upper portions 11 of its inside edge 2a. Base area 5 of the apparatus 100 may serve as an area where the apparatus 100 may be gripped by a person while operating the system. Base area 5 may house a built in compartment for battery and micro-processor intended to provide and control the power flow to LED lights employed within the system (not shown).

Base area 5 of the apparatus 100 may be curved along one of its outward facing lengthwise edges 27 to connect with the curved outward facing portion of each arm 10 of the apparatus 100. An opposite lengthwise edge 28 of a base area 5 may run straight for a length of approximately thirty millimeters. Base area 5 may comprise the shape of a polygon.

A microprocessor is a desirable element for operation of the system as it can be programmed to allow a power current going to an LED to be shut off in between each instance of application as well as to control the density of energy flow through pulse width modulation. Use of programmed operation of the apparatus in this manner can allow operation of the system with predetermined periods of exposure and delay, eliminating the need of an operator to attempt to determine appropriate periods of exposure and rest while operating the system. Such predetermination can increase operational efficiency and LED life expectancy and reduce possibility of excessive emission exposure to target areas.

A microprocessor employed within the system may be connected to a wireless rechargeable circuit and battery which may also be housed within a base area 5 of the apparatus 100, and may be linked with a blue tooth transmitter and receiver, as well as a micro controller and a safety shut off relay. Employment of a microprocessor may also allow the system to be operated in a wireless fashion.

A preferred embodiment of the system may also employ an application gel which may be formulated through a combination of a monomer and a photoinitiator.

Formulation of application gel may be achieved through combination of a monomer comprised of ethylene glycol dimethacrylate and a photoinitiator comprised of trimethylbenzoylphenyl phosphinate.

Composition of application gel may comprise an amount of photoinitiator ranging from one percent to five percent.

Application gel formulated in this fashion may be curable from a viscous state to a hardened state by exposure to emissions from LED lights affixed to arms 10 of the apparatus 100.

Application gel is intended to function as a substance which holds each application subject in place at each intended target area.

A first preferred embodiment of the system may be operated by employing a plurality of stages.

Figure 10:
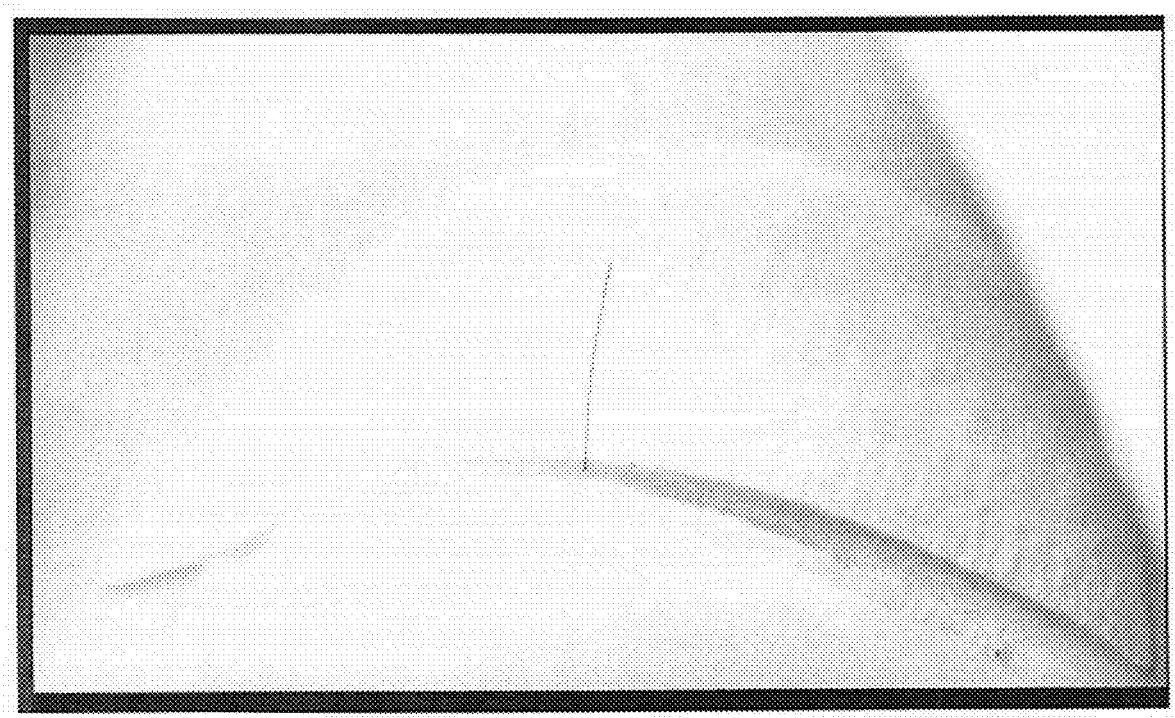
FIG. 10 depicts a first stage of operating the system where a protective strip is shown. A single eyelash is shown next to the protective strip to provide scale.

As depicted in FIG. 10 a first stage of operating the system may be expressed by preparing an application area. Preparation of an application area may include placement of a protective strip which may be comprised of a number of synthetic materials including cotton and any one of which may be coated with plastic to solve a problem of application gel potentially sticking to the strip. Protective strips may be cut to fit the contour of particular areas about which application points will be located.

Figure 11:
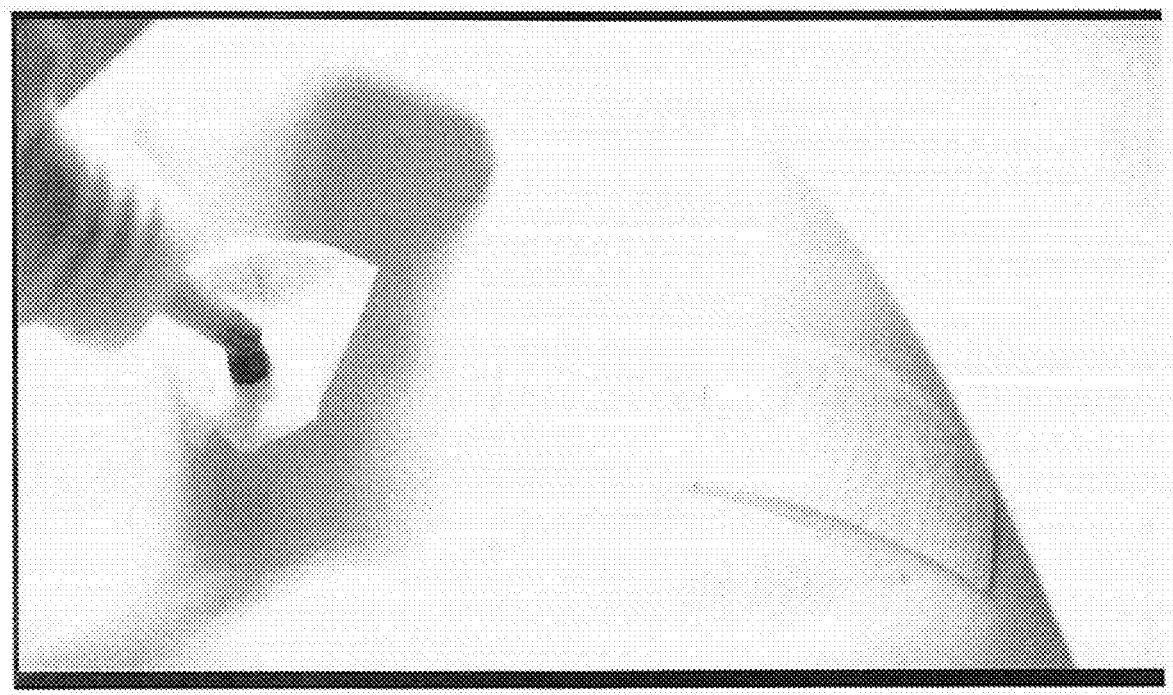
FIG. 11 depicts a second stage of operating the system where application gel is shown being placed upon a staging area next to the protective strip and application area.

As depicted in FIG. 11 a second stage of operating the system may be expressed by staging a desired amount of application gel at a suitable area. For this purpose, application gel may be placed upon a plurality of items including plastic adhesive dish or another protective strip.

Figure 12:
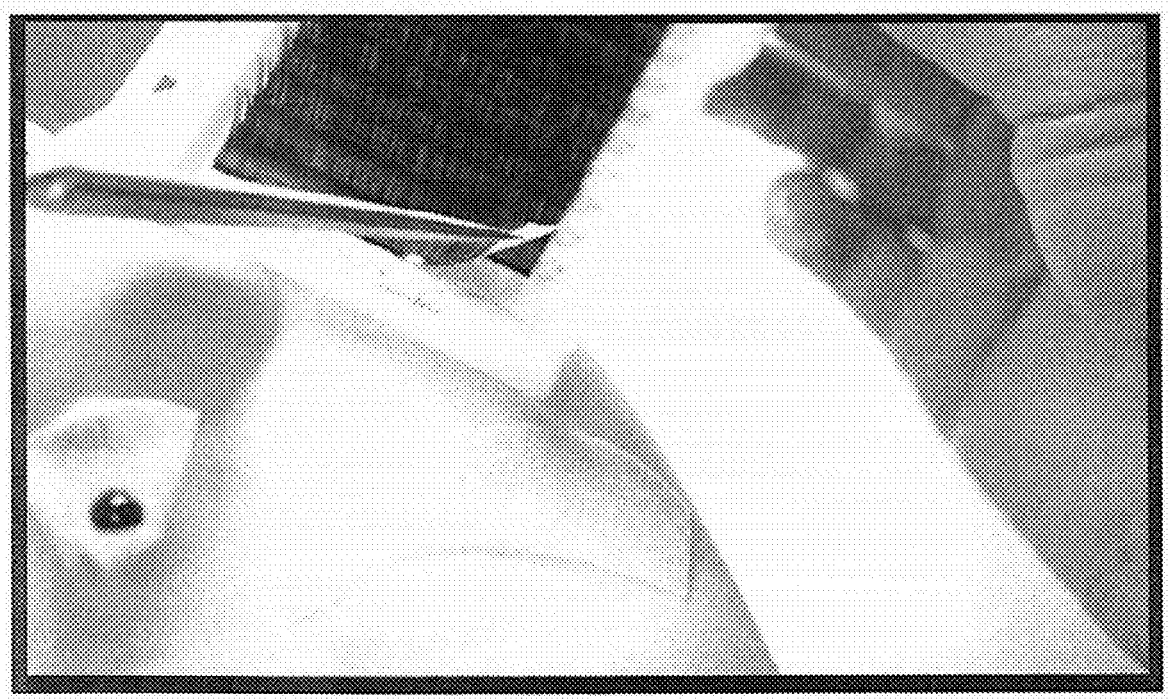
FIG. 12 depicts a third stage of operating the system where preparation of a strip of eyelash extensions is shown.

As depicted in FIG. 12 a third stage of operating the system may be expressed by laying the desired source of application subjects, such as a strip of eyelash extensions, near the staged application gel.

Figure 13:
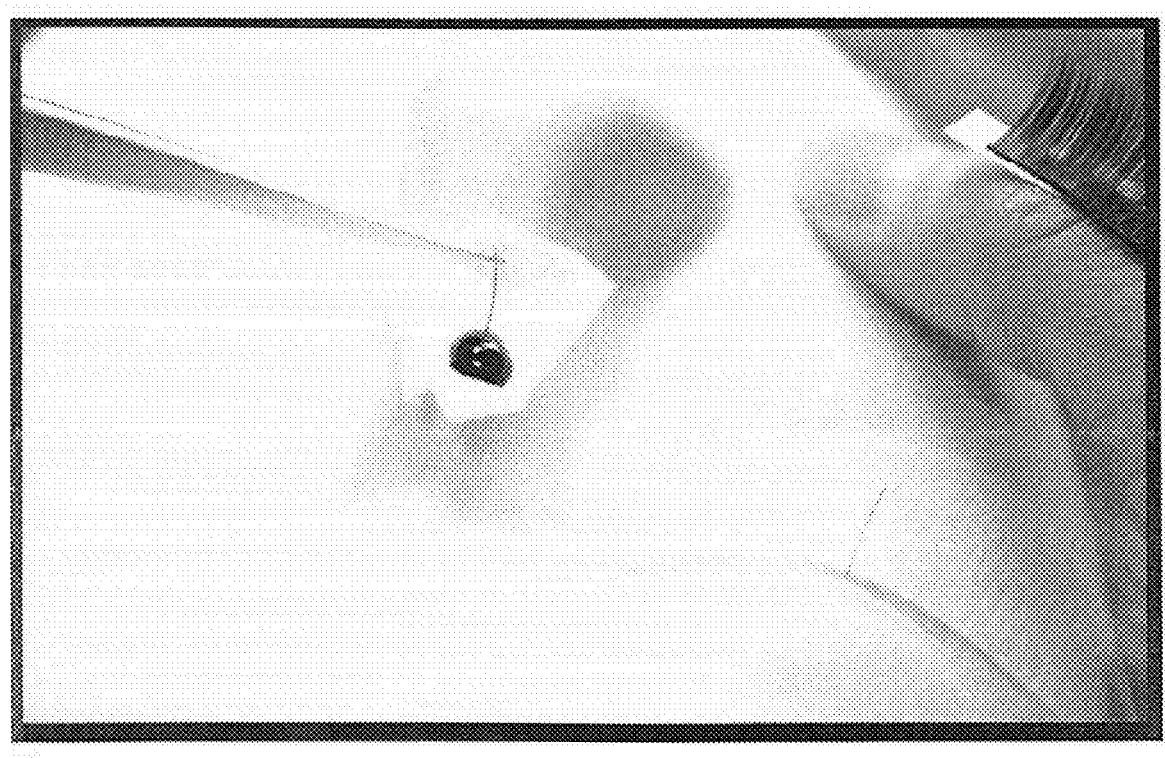
FIG. 13 depicts a fourth stage of operating the system where a desired application subject, in this case a single eyelash extension, is being dipped into the staged application gel next to the area of application.

As depicted in FIG. 13 a fourth stage of operating the system may be expressed by grasping a desired number of application subjects with the apparatus 100 and dipping each application subject into the application gel.

Figure 14:
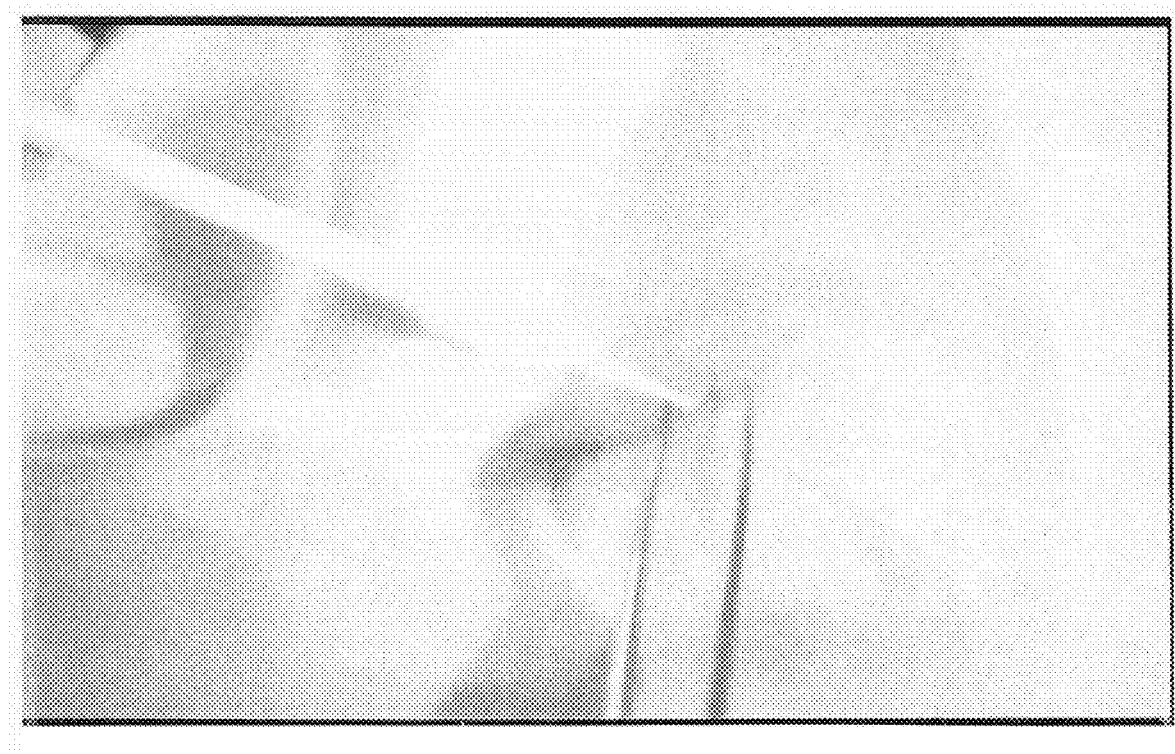
FIG. 14 depicts a fifth stage of operating the system where a brushless micro applicator is being used to smooth out application gel applied to an eyelash extension.

As depicted in FIG. 14 a fifth stage of operating the system may be expressed by using a brushless micro applicator to smooth out any application gel which may be uneven or clumping upon an application subject.

Figure 15:
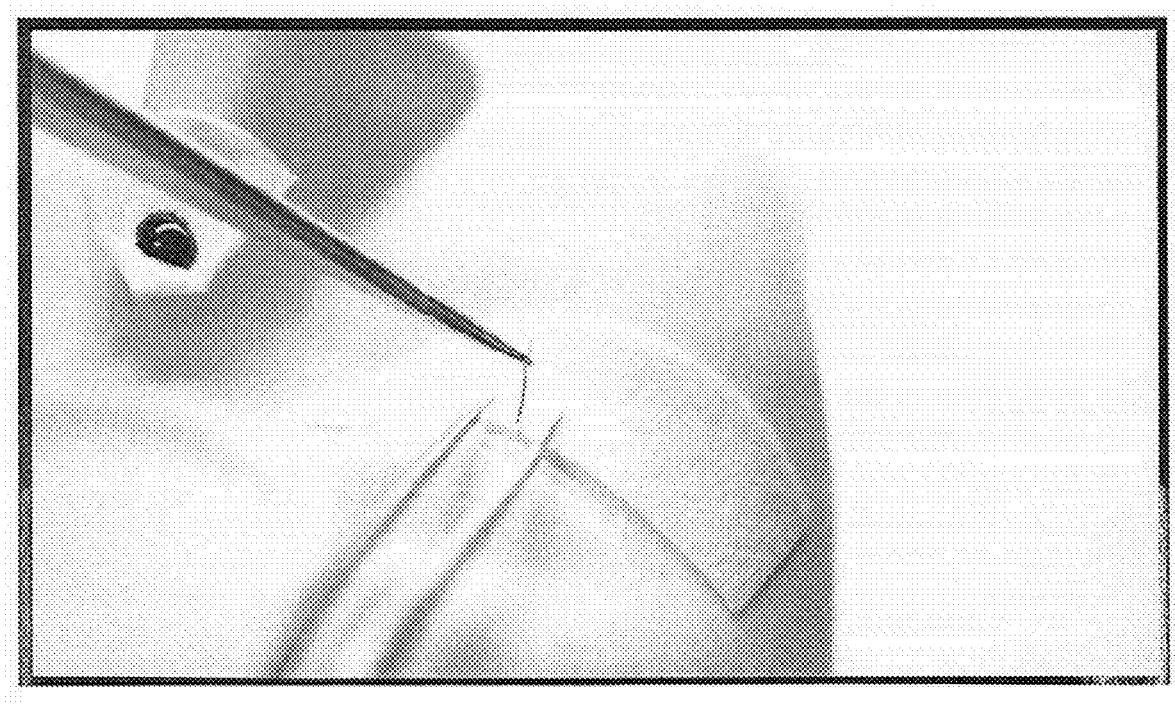
FIG. 15 depicts a sixth stage of operating the system where an eyelash with application gel coating one of its ends is being placed and positioned at a desired point of attachment.

As depicted in FIG. 15 a sixth stage of operating the system may be expressed by positioning an application subject with application gel upon it at a desired point of attachment.

Figure 16:
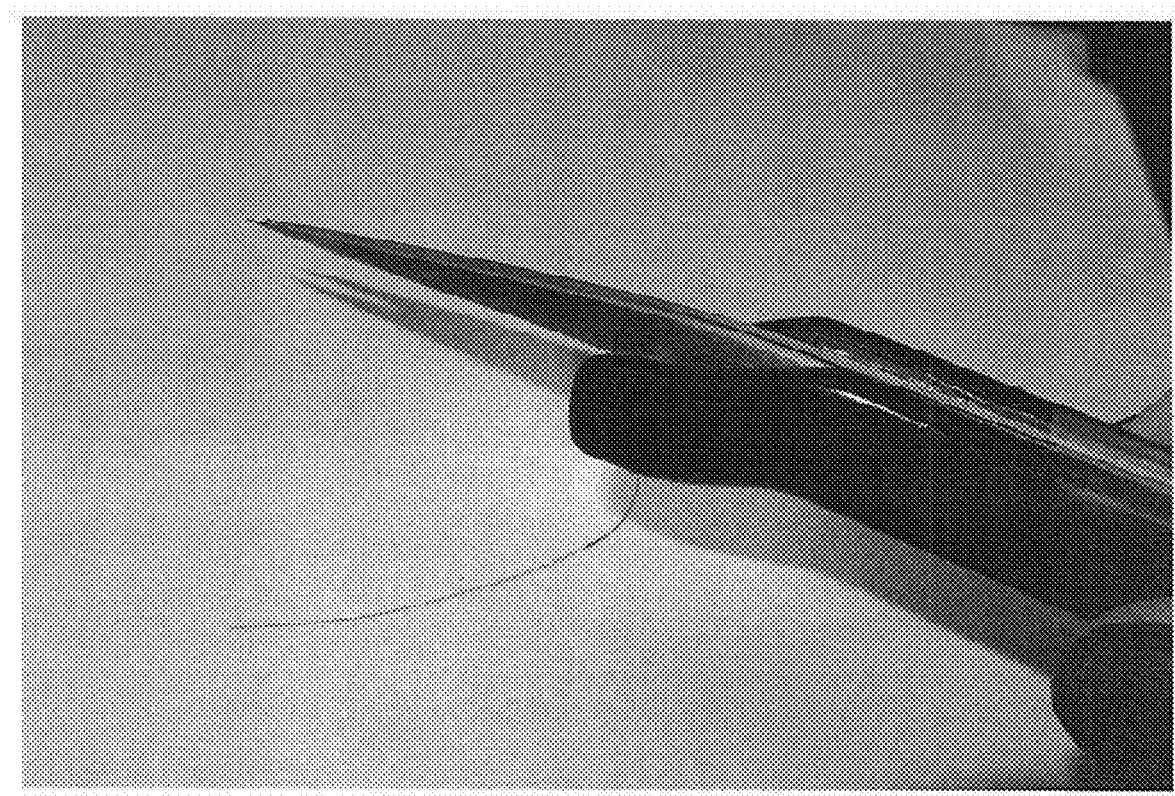
FIG. 16 depicts a seventh stage of operating the system where the apparatus is shown with its affixed LEDs turned on and positioned over an eyelash with application gel coating one of its ends.

As depicted in FIG. 16 a seventh stage of operating the system may be expressed by using emission from a UV light source to cure application gel on an application subject thus fixing it at a desired point of application in a desired position.

Stages one through seven of the system may be repeated as many times as is necessary to achieve a desired result.

Figure 9:
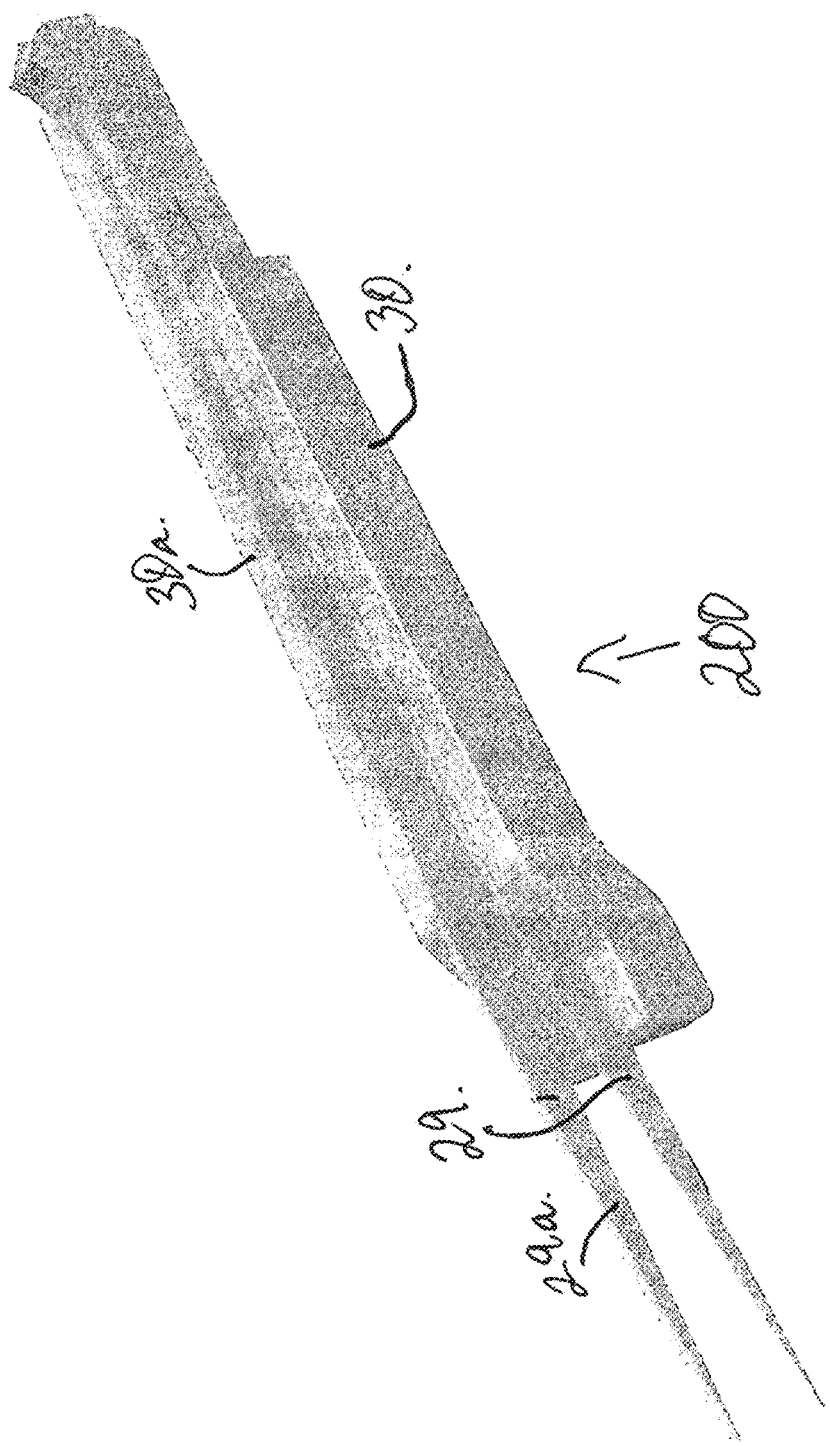
FIG. 9 depicts an alternative embodiment of an apparatus for applying eyelash extensions to a subject's eyelashes. The apparatus is shown without a base area and is shown with LED affixed arms directly affixed to tweezers on both sides.

While the foregoing is directed to embodiments of the present invention, other and further embodiments of the present invention may be devised without departing from the basic scope thereof, including incorporating a number of different tweezers and LED housing units of varying dimensions and shapes, with an example depicted in FIG. 9. In other embodiments, arms 10 of the apparatus 100 may incorporate length adjustment rings that may be turned to cause arms 10 to extend or retract. In other embodiments, application gels comprised of different combinations of monomers and photoinitiators may be employed.

Second Preferred Embodiment

In a second preferred embodiment the system may be operated with a second stage being expressed by placement of application gel in a desired amount directly at a desired area of attachment.

In a second preferred embodiment the system may be operated with a fifth stage being expressed by using a brushless micro applicator to smooth out any application gel which may be uneven or clumping at a desired area of attachment.

In a second preferred embodiment the system may be operated with a sixth stage being expressed by positioning an application subject in a desired position in application gel at an area of attachment.

Third Preferred Embodiment

As depicted in FIGS. 9 and 16, in a third preferred embodiment the system may be operated by using an apparatus 200 comprised of tweezers 29 and 29a and bracketing arms 30 and 30a which are shaped and attached to each other in a different fashion than what is depicted in FIGS. 1-8 as described in a first preferred embodiment.

Fourth Preferred Embodiment

In a fourth preferred embodiment the system may be operated by using an apparatus comprised of only a single arm affixed with an LED as opposed to bracketing arms. Use of only a single arm and affixed LED may be employed when lower energy consumption is desired.

Fifth Preferred Embodiment

In a fifth preferred embodiment an application subject may be hair extensions.

Sixth Preferred Embodiment

In a sixth preferred embodiment alternative sources of UV emission may be incorporated in an apparatus 300 and employed in operation of the system, including UV lasers.

I claim:
1. A method of attaching an extension of hair, comprising the steps of:
   placing protective material to protect selected areas of skin adjacent to one or more locations of hair where one or more extensions of hair are to be attached;
   grasping one or more extensions of hair with a tweezer-type tool having a base, a pair of opposing tweezer portions connected to the base at a common proximal end and extending away from the base to respective distal ends that are spaced-apart from each other, each tweezer portion having opposing top and bottom surfaces that extend from the base to the distal ends, where the bottom surfaces face one another, an arm extending over and above the top surface of one of the tweezer portions, and an ultraviolet light source coupled with the arm near the distal end of the one of the tweezer portions;
   applying a bonding agent to said one or more extensions of hair;
   smoothing out said bonding agent on said one or more extensions of hair as necessary;
   contacting said one or more extensions of hair to said one or more locations of hair; and
   illuminating said bonding agent on said one or more extensions of hair with the ultraviolet light source thereby hardening said bonding agent within a few seconds to attach said one or more extensions of hair to said one or more locations of hair.

2. The method according to claim 1, wherein said one or more extensions of hair comprise eyelash extensions attached to natural eyelashes.

3. The method according to claim 1, wherein said one or more extensions of hair are attached to hair growing naturally from skin.

4. The method according to claim 1, wherein said one or more extensions of hair are attached to artificial hair.

5. The method according to claim 1, wherein said protective material comprises a protective strip comprised of synthetic material.

6. The method according to claim 5, wherein said protective strip is coated with plastic material.

7. The method according to claim 1, wherein said bonding agent comprises cyanoacrylate-based low viscosity adhesive.

8. The method according to claim 7, wherein said cyanoacrylate-based low viscosity adhesive is pigmented.

9. The method according to claim 1, wherein said bonding agent comprises a monomer and a photoinitiator.

10. The method according to claim 9, wherein said monomer comprises ethylene glycol dimethacrylate and said photoinitiator comprises trimethylbenzoylphenyl phosphinate.

11. The method according to claim 9, wherein said monomer comprises an amount of photoinitiator ranging from 1% to 5%.

12. The method according to claim 1, wherein said bonding agent comprises a UV curable gel.

13. The method according to claim 12, wherein said UV curable gel is pigmented.

14. The method according to claim 1, wherein said UV light source is a light emitting diode.

15. The method according to claim 1, wherein said UV light source is a UV laser.

16. The method of claim 1, the illuminating step further comprising:
controlling, using a microprocessor, exposure of the bonding agent to the ultraviolet light source.

17. The method of claim 16, the controlling step further comprising:
using pulse width modulation to control the exposure of the bonding agent to the ultraviolet light source.

18. A kit for attaching an extension of hair, comprising:
one or more extensions of hair;
protective material configured to protect selected areas of skin to which it is applied;
a bonding agent;
an applicator, the applicator comprising opposing applicator elements connected to a base at a common proximal end, and extending away from the base to respective spaced apart distal ends, each applicator element having opposing top and bottom surfaces that extend from the base to the distal ends, where the respective bottom surface of each applicator element faces the bottom surface of the opposing applicator element; and
a fastener having an arm extending from the base and above and spaced-apart from the top surface of one of the applicator elements at its distal end, and an ultraviolet light source coupled to the arm near a distal end of the fastener.

* * * * *